(12) United States Patent
Prat Terradas et al.

(10) Patent No.: US 8,469,158 B2
(45) Date of Patent: Jun. 25, 2013

(54) OPERATING SYSTEM FOR A PARKING BRAKE

(75) Inventors: Jaume Prat Terradas, Barcelona (ES); Jordi Vidal Jornet, Terrassa (ES)

(73) Assignee: Fico Cables, S.A., Mollet del Valles (ES)

( * ) Notice: Subject to any disclaimer, the term of this patent is extended or adjusted under 35 U.S.C. 154(b) by 1240 days.

(21) Appl. No.: 11/570,670

(22) PCT Filed: Jun. 13, 2005

(86) PCT No.: PCT/EP2005/006310
§ 371 (c)(1), (2), (4) Date: Jun. 28, 2007

(87) PCT Pub. No.: WO2005/120914
PCT Pub. Date: Dec. 22, 2005

(65) Prior Publication Data
US 2008/0006488 A1    Jan. 10, 2008

(30) Foreign Application Priority Data
Jun. 14, 2004  (DE) .......................... 10 2004 028 737

(51) Int. Cl.
*F16D 55/08*      (2006.01)
*F16D 65/00*      (2006.01)

(52) U.S. Cl.
USPC ......... 188/72.9; 188/2 D; 188/265; 192/219.4

(58) Field of Classification Search
USPC .............. 188/2 D, 72.9, 156, 265, 73.1, 72.6, 188/72.7; 192/219.4, 219.5, 219.6; 74/500.5, 74/501.6, 502.6
See application file for complete search history.

(56) References Cited

U.S. PATENT DOCUMENTS

| | | | |
|---|---|---|---|
| 3,620,099 A | 11/1971 | Stotz | |
| 4,212,211 A * | 7/1980 | Rickert | 74/538 |
| 4,373,402 A * | 2/1983 | Barrett | 73/862.391 |
| 4,629,043 A * | 12/1986 | Matsuo et al. | 477/184 |

(Continued)

FOREIGN PATENT DOCUMENTS

| | | |
|---|---|---|
| DE | 17 55 911 | 10/1971 |
| DE | 4134052 | 4/1993 |

(Continued)

OTHER PUBLICATIONS

International Search Report (5 pages).

(Continued)

*Primary Examiner* — Melody Burch
(74) *Attorney, Agent, or Firm* — Marshall, Gerstein & Borun LLP (57) ABSTRACT

An operating system for a parking brake, in particular of a motor vehicle, includes an operating element which is manually brought from a release position to a brake position for engaging the parking brake and which can be removed from the brake position without disengaging the parking brake. The operating system includes a follower element which is connected to the operating element such that the follower element follows any movement of the operating element. Further, the operating system includes a releasable locking mechanism with a locking element to lock the follower element in the brake position and a separating element which allows to separate the connection between the operating element and the follower element independently from the releasable locking mechanism.

14 Claims, 7 Drawing Sheets

U.S. PATENT DOCUMENTS

| | | | |
|---|---|---|---|
| 5,001,942 A * | 3/1991 | Boyer | 74/535 |
| 5,205,184 A | 4/1993 | Noel et al. | |
| 5,243,856 A * | 9/1993 | Yamazaki et al. | 74/538 |
| 5,247,850 A | 9/1993 | Lenzke | |
| 5,624,352 A | 4/1997 | Smale | |
| 6,863,162 B1 | 3/2005 | Gabas | |
| 6,913,121 B2 * | 7/2005 | Park | 188/156 |
| 6,978,870 B2 * | 12/2005 | Powrozek et al. | 188/156 |
| 2001/0020377 A1 | 9/2001 | Matsuzaki et al. | |
| 2002/0033642 A1 | 3/2002 | Holl | |
| 2003/0227215 A1 | 12/2003 | Kinder et al. | |
| 2004/0074331 A1* | 4/2004 | Sykes et al. | 74/523 |
| 2008/0035436 A1* | 2/2008 | Chiang | 188/2 D |

FOREIGN PATENT DOCUMENTS

| | | |
|---|---|---|
| DE | 69016657 | 9/1995 |
| DE | 198 18 339 | 2/2000 |
| DE | 100 27 019 | 12/2001 |
| DE | 10027019 | 12/2001 |
| DE | 10063062 | 6/2002 |
| DE | 101 53 038 | 5/2003 |
| DE | 102 33 034 | 2/2004 |
| EP | 0 476 208 | 3/1992 |
| EP | 0480108 | 4/1992 |
| EP | 0 546 927 | 6/1993 |
| EP | 1 300 306 | 4/2003 |
| JP | 9-11869 | 1/1997 |
| JP | 2002-255016 | 9/2002 |
| WO | WO 2004/056629 | 7/2004 |

OTHER PUBLICATIONS

International Preliminary Report on Patentability (15 pages).

* cited by examiner

OPERATING SYSTEM FOR A PARKING BRAKE

1. THE TECHNICAL FIELD

The present invention relates to an operating system for a manually operated parking brake, in particular of a motor vehicle.

2. THE PRIOR ART

Typically, parking brakes of a vehicle are manually operated by a lever which is moved from a lower position to an upper position. The lever is generally arranged between the seats of the driver and the front-seat passenger. A ratchet mechanism avoids that the parking brake disengages by itself. In the applied position the lever remains in its upper position. For a release of the brake, the braking lever typically comprises an operating knob at its upper end which serves to release the ratchet mechanism.

However, for a flexible use of the passenger compartment it is a disadvantage if the lever remains in the upper position, since it blocks for example a rotation of the seats of the driver and the front seat passenger in a camping car. Also for aesthetic reasons it is advantageous if the brake lever can be brought back into the lower position without disengaging the parking brake. Finally, an upright brake lever renders it difficult to leave the car via the side of the front seat passenger, if the vehicle is parked directly adjacent to a wall on the driver side so that it is impossible to leave the car on this side.

As a solution for this problem, the DE 17 55 911 discloses a foldable brake lever which can partly be moved down by folding its front part. A similar design is know from the EP 0 476 208 B1.

A different approach is disclosed in the EP 0 546 927. In this design a rod connected to the operating knob at the front end of the brake lever is at first used to release the ratchet mechanism. However, a pulling movement on the same operating knob allows in addition to lift the rod from the ratchet mechanism so that the overall brake lever can be downwardly tilted without disengaging the parking brake. If the parking brake is to be disengaged, the brake lever has at first to be brought back into the upper position so that the rod connected to the operating knob can again act upon the ratchet mechanism.

However, both approaches from the prior art for lowering the brake lever of an engaged parking brake have significant disadvantages. The dividing of the brake lever into two parts according to the DE 17 55 911 and the EP 0 476 208 B1 allows only to "hide" a part of the brake lever and additionally reduces its stability. In the approach known from the EP 0 546 927 the brake lever has at first to be brought into an upright position so that the rod can release the ratchet mechanism. This makes a release of the brake more complicated. Furthermore, it is comparatively difficult to pull the operating knob at the front end of the brake lever into a forward direction in order to lower the brake lever.

Another approach, finally, is known from the DE 100 27 019 A1 and the DE 102 33 034 A1. In these systems, the brake lever automatically returns to the rest position after the brake has been applied as soon as the driver lifts his hand from the brake lever. The hiding of the brake lever can not be controlled, but is automatically performed by a spring integrated into the lever system or simply under the influence of gravity. Such a system will surprise many drivers, which are used to the brake lever to remain in an upright position, when the brake is applied.

According to a first aspect it is therefore the problem of the present invention to provide an operating system for a parking brake which allows to lower the brake lever, if desired, without the above explained disadvantages of the prior art.

Another problem concerning parking brakes is their controlled release. For example when starting a car on an inclined road, many drivers find it difficult to release the parking brake in a controlled manner while simultaneously performing other steps necessary for accelerating the car. To solve this problem it is known to provide an electrically operated parking brake comprising an electric motor, the operation of which is controlled by additional sensors. Such a design is for example disclosed in the DE 198 18 339 of applicant. However, electrical parking brakes require a comparatively complicated construction and are therefore costly to produce.

According to a further aspect it is therefore the problem of the present invention to provide an operating system for a parking brake which facilitates the controlled release of the parking brake without the disadvantages of the prior art.

3. SUMMARY OF THE INVENTION

According to a first aspect, the present invention concerns an operating system for a parking brake, in particular of a motor vehicle, comprising an operating element which is manually brought from a release position to a brake position for engaging the parking brake and which can be removed from the brake position without disengaging the parking brake. The operating system comprises a follower element which is connected to the operating element such that the follower element follows any movement of the operating element. The operating system further comprises a releasable locking mechanism with a locking element allowing to lock the follower element in the brake position, and a separating element which allows to separate the connection between the operating element and the follower element independently from the releasable locking mechanism.

According to the present invention, the functions of disengaging the parking brake on the one hand and lowering the operating lever on the other hand are preferably realized by independent design elements. Whereas the releasable locking mechanism locks the follower element and thereby the brake element, for example a Bowden cable, in a braking position or selectively releases these elements, the operating element can independently therefrom be separated from the follower element. A subsequent lowering of the operating element remains without effect on the follower element and therefore on the state of the brake.

In contrast to the prior art, wherein the brake lever must at first be moved to the upright position, the construction according to the invention allows to disengage the parking brake in any position of the operating element. As a result it is for example possible to disengage the parking brake simply by pressing an operating knob similar to an electrical parking brake, which is by far more complicated to produce.

Another advantage is that the connection between the operating element and the follower element is only interrupted, if the separating element is used. Accordingly, the hiding of the brake lever can be controlled by the driver and is therefore an optional feature and not inevitably performed each time the brake is applied.

The operating system comprises preferably a mounting plate to which the operating element and the follower element are rotatably attached. Preferably, a supporting element is additionally provided which is permanently connected to the operating element, wherein the operating element is attached to a first bearing of the mounting plate and the support element is attached to a second bearing of the mounting plate. This double bearing significantly increases the stability and life-time of the operating system.

The follower element is in a preferred embodiment connected to a mounting frame to which at least one brake cable is attached, wherein the mounting frame is preferably arranged between the operating element and the supporting element.

The locking mechanism and the separating element are preferably controlled by a first and a second control element arranged at the operating element, wherein the operating element is preferably provided as a rotatable lever and wherein the first and second control element are arranged in the end part of the lever.

All three functions of the operating system, i.e. the operation of the brake by pulling the lever, the disengaging of the brake with the first control element and the lowering of the lever with the second control element can therefore be easily performed with a single hand. The first as well as the second control element are each preferably provided as an operating knob. In an alternative, presently most preferred embodiment, the second control element for operating the separating element is provided as a turning handle.

In a particularly preferred embodiment the locking mechanism comprises a clutch spring which allows in the closed state a rotation of a pinion only in a first direction. The pinion cooperates preferably with the toothed section of the follower element. This leads to a continuously variable locking mechanism allowing to arrest the brake not only in a number of predefined positions but in any arbitrary position.

In this embodiment the clutch spring comprises preferably a free end for releasing the locking mechanism, wherein the free end can preferably be deflected by means of a Bowden cable and/or a linkage so that the pinion can rotate in the first and a second direction.

In another embodiment the locking mechanism comprises a ratchet cooperating with a toothed section of the follower element. The ratchet can preferably be separated from the toothed section of the follower element by means of a Bowden cable and/or a linkage in order to free the follower element so that it can return from the brake position to the release position.

The separating element is preferably provided as a pawl engaging a corresponding recess. The pawl is preferably arranged at the operating element and engages a recess of the follower element. Using a further Bowden cable and/or linkage the pawl can be lifted from the recess so that the operating element can be freely moved in a downward direction with respect to the follower element.

According to a further aspect, the present invention concerns an operating system for a manually operated parking brake of a motor vehicle with a brake lever, the operation of which causes the manual application of the parking brake, a control element for a release of the manually applied parking brake and a supervising system, which detects at least one parameter of the motor vehicle, so that an operation of the control element only leads to a release of the parking brake, if the at least one parameter has a suitable value.

Whereas in manually operated parking brakes according to the prior art the brake is released whenever the respective control element—for example the well-known knob at the front of the brake lever—is pressed, the present invention provides an additional supervising system, which verifies, whether a release of the parking brake is appropriate for the actual situation of the car. For example, if the car is parked on an inclined road, the supervising system will release the manual parking brake only after the motor vehicle is ready to accelerate into the desired direction to avoid an unintended downhill rolling of the car.

The second aspect of the present invention is particularly useful, if the control element for a release of the parking brake can be operated independently from the position of the brake lever. If the brake lever is no longer involved in the release of the brake, the supervising system preferably assures that the sudden release of the parking brake will not lead to unsafe conditions of the vehicle.

Preferably, the control element comprises an electromechanical and/or a hydraulic and/or a pneumatic actuator, and the supervising system controls the supply of electric current and/or hydraulic and/or pneumatic pressure to the actuator.

In a more simple embodiment the value of the at least one parameter is determined by an additional switch. The switch provides an additional confirmation that the driver indeed intends to release the parking brake. In another preferred embodiment the value of the at least one parameter is determined by a sensor sensing the orientation of the motor vehicle and/or the state of the motor of the vehicle.

Further modifications of the described operating system are the subject matter of further dependent claims.

4. SHORT DESCRIPTION OF THE DRAWINGS

In the following detailed description presently preferred embodiments of the present invention are described with reference to the drawing. The figures in the drawing show.

5. DETAILED DESCRIPTION OF PREFERRED EMBODIMENTS

In the following several presently preferred embodiments of the present invention are described with reference to a manual parking brake for a motor vehicle. However, it is to be understood that the present invention may also be used in other technical fields where a brake is manually operated.

Figure 1:
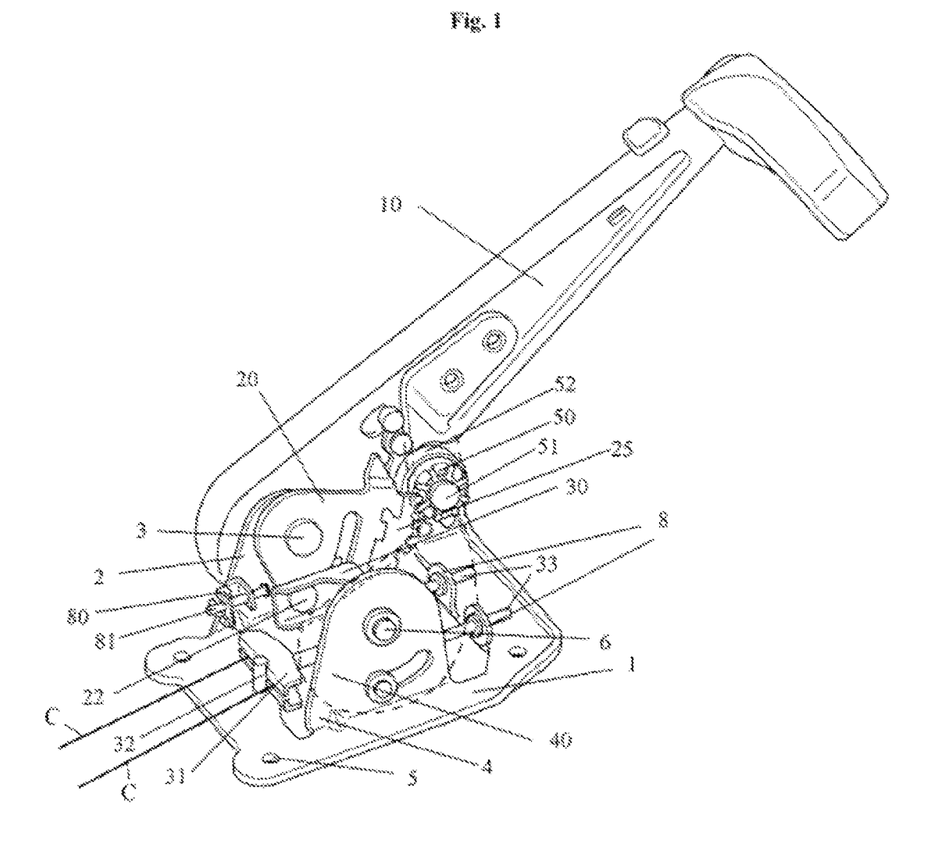
FIG. 1: A general view of a first embodiment of the invention when the parking brake is disengaged.
Figure 2:
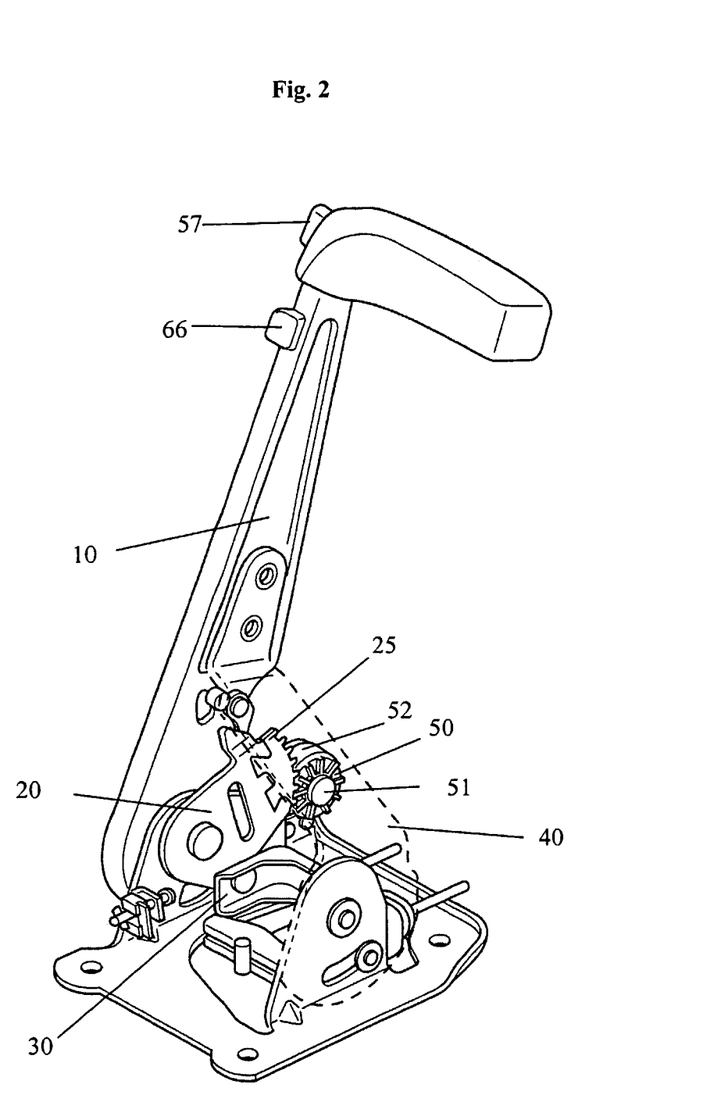
FIG. 2: A general view of the embodiment of FIG. 1 when the parking brake is engaged.

FIG. 1 shows a perspective general view of a first embodiment. A brake lever 10, being preferably made in one piece, is rotatably arranged on an upright mounting projection 2 of a mounting plate 1. The brake lever 10 can be rotated from a lower position to an upper position which is shown in FIG. 2. The mounting plate 1 comprises holes 5 or the like in order to attach the overall system to a motor vehicle.

A pulling lever 20 is rotatably arranged preferably on the same axle 3 around which the brake lever 10 is rotated. On the side of the pulling lever 20 directed to the brake lever 10 the pulling lever 20 comprises a projection 21 which extends through an elongated hole 11 at the lower end of the brake lever 10 (cf. side view in FIG. 5). When the shift lever 10 is upwardly rotated, the projection 21 contacts the rear end of the elongated hole 11 so that the pulling lever 20 is entrained and therefore also upwardly rotated around the axle 3. For this entrainment it is presently preferred, however not necessary, that the pulling lever 20 rotates around the same axle 3 as the brake lever 1. Conceivable is also an arrangement on the mounting plate 1 with two axles which are spaced apart.

On the side of the pulling lever 20 opposite to the brake lever 10 the pulling lever 20 comprises a further projection 22 which extends through a hole in a mounting frame 30. An equalizer 31 is arranged at the mounting frame 30 having two openings in which two brake cables C can be inserted as illustrated in FIG. 1. The equalizer 31 comprises an axle 32 so that it can compensate the different lengths of the two brake cables.

The above explained rotation of the pulling lever 20 under a movement of the brake lever 10 from a lower position (cf. FIG. 1) to an upper position (cf. FIG. 2) causes the mounting frame 30 for the brake cables to be pulled into a substantially forward direction (compare the position of the mounting frame 30 in FIGS. 1 and 2). This provides the linear movement necessary for operating the brakes at the wheels (not shown).

On its front side the mounting frame 30 comprises two guiding rods 33 sliding in corresponding guiding holes 8 of the mounting plate 1 (cf. FIG. 1). The exact guidance due to the guidance holes 8 avoids a jamming of the mounting frame 30 during its linear movement.

As only schematically shown in FIGS. 1 and 2, the mounting plate 1 comprises a further mounting projection 4 on the side opposite to the mounting projection 2. A supporting lever 40 is arranged there by means of a further axle 6, wherein the supporting lever 40 is at its upper end rigidly connected to the brake lever 10. The stability of the anchoring of the overall lever system to the mounting plate 1 is thereby significantly increased.

A switch assembly 80 is arranged at the rear end of the mounting plate 1 which serves to detect the position of the pulling lever 20. The switch assembly 80 comprises a pin 81, which contacts the pulling lever 20. Based on the position of the pin 81 an electrical signal for the parking brake lamp is generated, which indicates the position of the brake to the driver. However, other detectors can also be used to provide the necessary signal for the parking brake lamp.

On its front side the pulling lever 20 comprises a toothed section 25. As can be clearly seen in the detailed view of FIG. 4, the toothed section 25 can be separately manufactured, for example from a hardened metal and can subsequently be brought in engagement with the pulling lever 20 by suitable projections and recesses. This allows to produce the pulling lever 20 from lightweight plastic materials. However, it is also conceivable to provide the pulling lever 20 including the toothed section 25 as a single piece.

A pinion 50 rotatably supported on an axle 51 is rotated by the toothed section 25 when the pulling lever 20 is turned. A clutch spring 52 is arranged around the rear part of the pinion 50. In the normal state, the clutch spring 52 allows a rotation of the pinion 50 only in the direction of the arrow (cf. FIG. 4), whereas the opposite rotation is blocked by the clamping action of the clutch spring 52.

Therefore, if the driver rotates the brake lever 10 from the position shown in FIG. 1 to the position shown in FIG. 2, the pulling lever 20 will follow and can no longer return on its own into the lower position. As a consequence, the brake remains engaged due to the explained locking mechanism. In contrast to the ratchet mechanism explained further below, the use of the clutch spring 52 allows to lock the pulling lever 20 in any arbitrary intermediate position.

Figure 5:
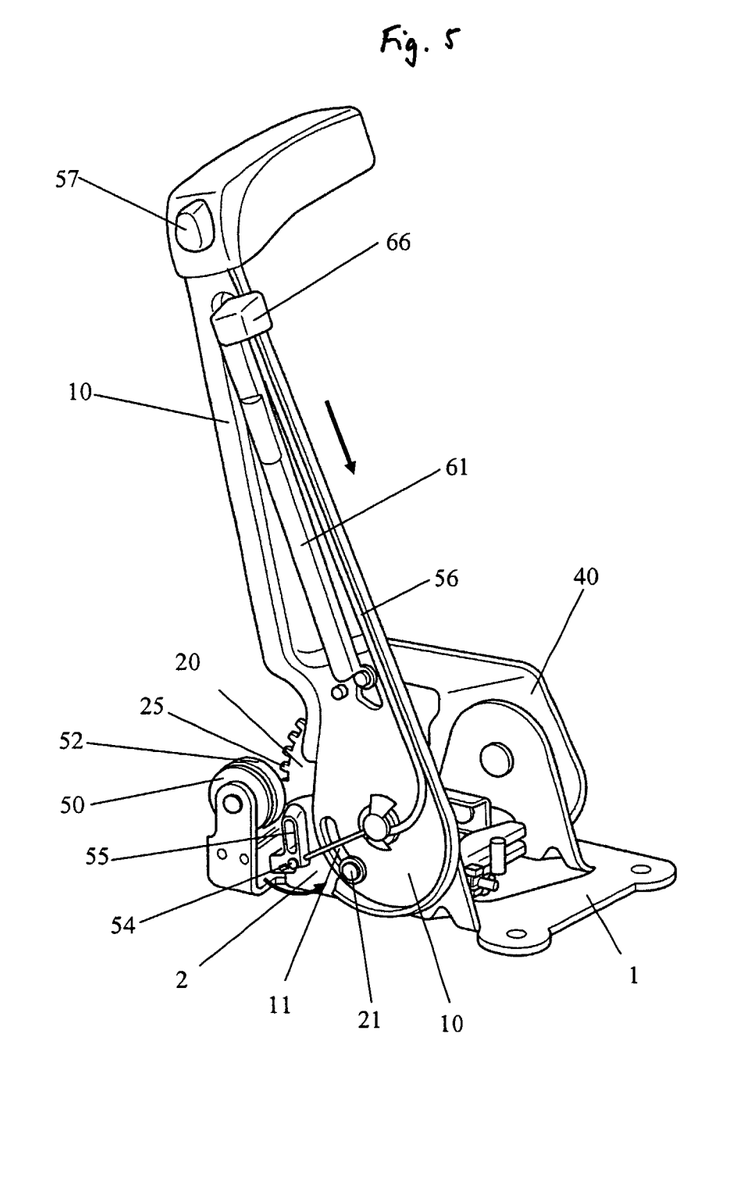
FIG. 5: A lateral view of the embodiment of FIGS. 1 to 4.

The front end 53 of the clutch spring 52 is attached to the mounting plate 1 with fixing means 7. The side view of FIG. 5 shows, that the rear end 54 of the clutch spring 52 is moveably arranged within a release lever 55 which is rotatably arranged at the mounting projection 2 of the mounting plate 1. The release lever 55 can be rotated by means of a Bowden cable 56 as shown in FIG. 5. This Bowden cable 56 is at one end connected to the operating knob 57 which is arranged in the front part of the brake lever 10.

If the parking brake is to be disengaged, the release lever 55 is in the position shown in FIG. 5 pulled to the rear when the operating knob 57 is pressed (cf. the arrow at the release lever 55 in FIG. 5). As a result, the clutch spring 52 is slightly opened so that the pinion 50 can rotate in two directions. This allows the pulling lever 20 to rotate the pinion 50 against the direction of the arrow in FIG. 4 so that the pulling lever 20 can return to its starting position as shown in FIG. 1. As a consequence, the mounting frame 30 moves to the rear and the brake cables and the connected brakes at the wheels are released.

Figure 3:
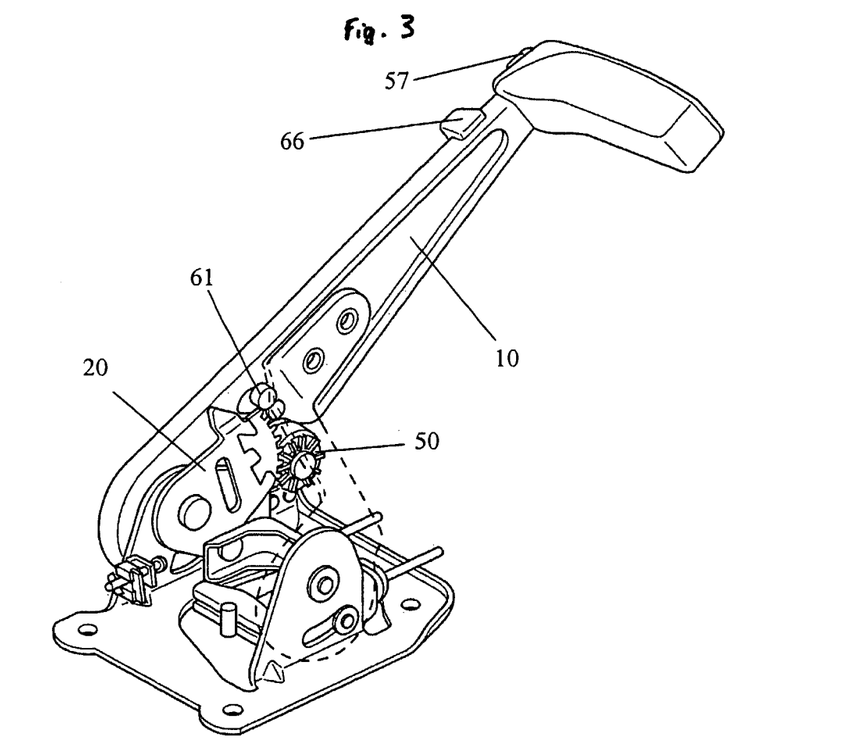
FIG. 3: A general view of the embodiment of FIG. 1 when the brake lever is lowered, while the parking brake remains engaged.

The transition from the position of the brake lever 10 in FIG. 2, wherein the brake is engaged, into the position shown in FIG. 3 shows the lowering of the brake lever 10 without a release of the brake. As can be directly seen from a comparison of FIGS. 2 and 3, the pulling lever 20 remains in its upper position and only the brake lever 10 is lowered. The separate rotation is possible, since on the one hand the projection 21 of the pulling lever 20 can move to the front in the elongated hole 11 (cf. FIG. 5), and since on the other hand a pawl 60, which blocks initially an independent movement of the brake lever 10 relatively to the pulling lever 20 (cf. FIG. 4) in any direction, can be lifted by means of a linkage 61 (cf. FIG. 5) so that the mechanical connection between the brake lever 10 and the pulling lever 20 is interrupted. Whereas the brake lever 10 and the pulling lever 20 are initially connected such that the pulling lever 20 will follow the brake lever 10 in both directions of rotation, the lifting of the pawl 60 separates this close mechanical connection so that the brake lever 10 can be rotated independently from the pulling lever 20.

Figure 4:
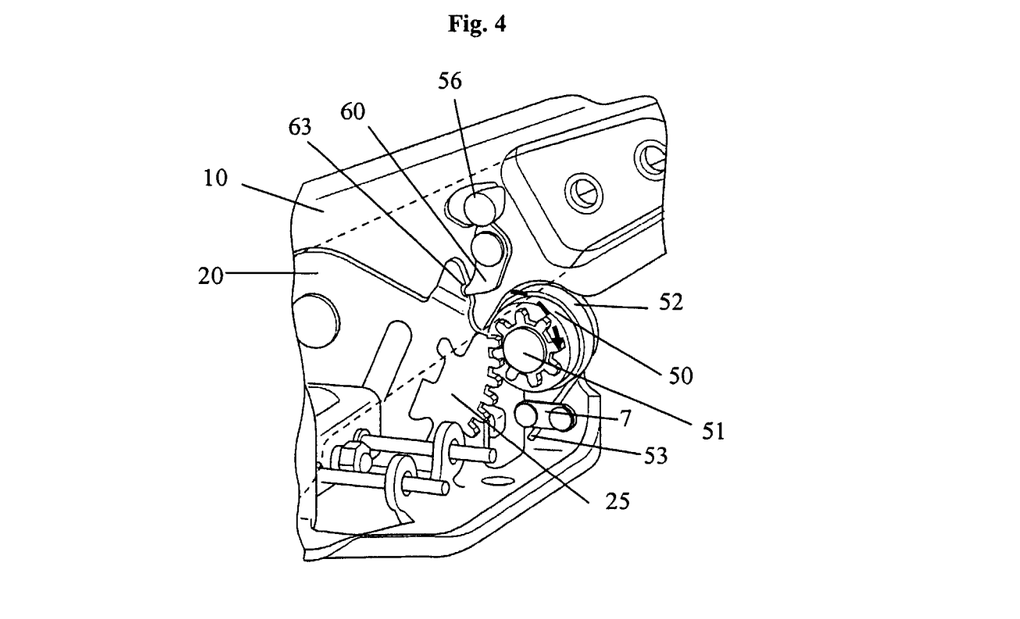
FIG. 4: A detailed presentation of the embodiment of FIGS. 1 to 3.

As can be derived from the detailed presentation in FIG. 4, the pawl 60 is rotatably arranged at the brake lever 10 so that it generally engages a corresponding recess 63 of the pulling lever 20. However, an inverse arrangement is also possible, wherein the pawl 60 is attached to the pulling lever 20 and engages a recess in the operating lever 10.

The linkage 61 terminates in an operating knob 66 which is also arranged in the front part of the brake lever 10 (cf. FIG. 5). If the operating knob 66 is downwardly pushed (cf. the arrow in FIG. 5), the pawl 60 is lifted from the recess 63 and the brake lever 10 can be downwardly moved without releasing the brake. Alternatively to using the discussed pawl, the pulling lever 20 and the brake lever 10 can also be interconnected by a moveable bolt (not shown), which is attached on one lever and extends through an opening in the other lever. Such a bolt may also be controlled using a linkage or a Bowden cable.

The discussed mechanism allows to lower the complete brake lever 10 and not only a part thereof. However, it is also conceivable to use the discussed design, if only a part of the brake lever 10 is to be lowered.

Since the operating knob 57 and the locking mechanism comprising the clutch spring 52 and the pinion 50 are structurally as well as functionally completely independent from the pawl 60 and its operation by the operating knob 66, the parking brake can be disengaged in any position of the brake lever. However, if the brake lever 10 is in the lowered position, the brake is instantly disengaged when the operating knob 57 is pressed (similar to the release of an electrical parking brake). By contrast, if the brake is disengaged by pressing the operating knob 57 in the position shown in FIG. 2, the release can be controlled by a slow downward movement of the brake lever 10.

In order to avoid an unintended release of the manually engaged parking brake the operating knob 57 can be differently designed, so that it no longer projects from the side of the brake lever 10 but is flush with the surface of the lever.

According to a further embodiment (not shown) the operation of the knob 57 does not immediately release the brake. To this end the Bowden cable 56 and the release lever 55 are replaced by an electromechanical actuator. A hydraulic or a pneumatic actuator are also conceivable. This actuator is arranged at the rear end 54 of the clutch spring 52 and opens the clutch spring 52 if electric current is supplied, for example if a suitable knob has been pressed, which can be provided at the brake lever 10 but also in any other position.

In this embodiment (not shown) a supervising system is additionally provided, which verifies, whether the release of the brake will endanger the car. In one alternative the supervising system will simply assure that an additional switch has also been pressed to confirm that the driver really intends to release the brake. A more sophisticated design of the supervising system, which uses appropriate electronics, determines the orientation of the car and/or the state of the motor and/or 20 other parameters to provide a intelligent decision, whether it is safe to release the parking brake. Preferably, the supervising system includes a display informing the driver about the state of the parking brake and whether a release is possible or not.

For emergencies it is preferred, if the supervising system can be deactivated in order to assure that the brake can be released, for example in case of a power failure of the electronics of the supervising system. Further, it is for such a situation also preferable, if the electromechanical actuator for opening the clutch spring 52 can also be operated manually, for example by means of a Bowden cable or a suitable linkage.

The described electromechanical actuator and the supervising system can also be used for a release of the parking brake in any of the modified embodiments of the operating system for a parking brake described below, wherein instead of the clutch spring 52 a different locking mechanism is used.

Figure 6:
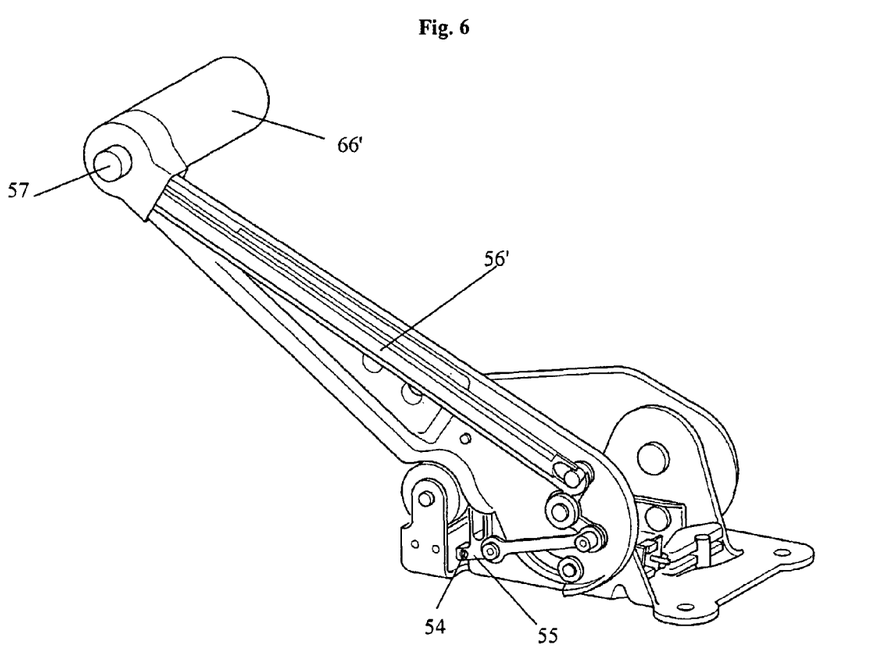
FIG. 6: A lateral view of a further embodiment using a linkage for the release of the brake.
Figure 7:
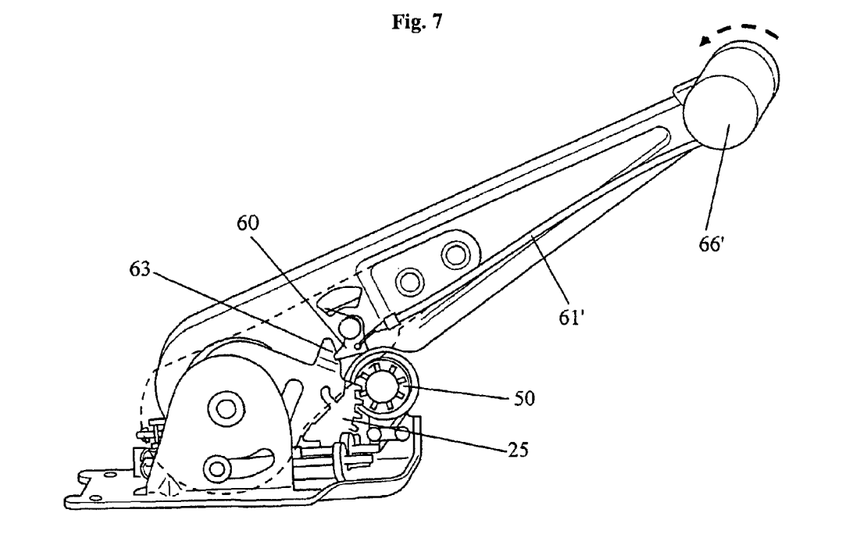
FIG. 7: A view of the embodiment of FIG. 6 from the other side.

FIGS. 6 and 7 shows another embodiment, wherein the release lever 55 for the clutch spring 52 is rotated by means of a linkage 56' and not by a Bowden cable. However, the basic principle remains unchanged, i.e. a movement of the release lever 55 opens the clutch spring 52.

Conversely, the pawl 60 is in the embodiment of FIGS. 6 and 7 lifted by means of a Bowden cable 61' from the recess 63 (cf. FIG. 7). It can be seen that it is also possible to use two Bowden cables for the locking mechanism and the separating mechanism or two linkages.

The embodiments of FIGS. 6 and 7 further differ from the first embodiment by the control element for releasing the brake lever for a downward movement. Instead of the operating knob 66 a turning handle 66' is used. This is presently the most preferred embodiment. As indicated by the arrow in FIG. 7, a rotation of the handle 66' leads to an operation of the Bowden cable 61'. Generally, the turning handle 66' as well as the above mentioned operating knobs 57 and 66 can be replaced by different control elements which transmit a movement onto a linkage or a Bowden cable. Conceivable is also the use of electromagnetic control elements for opening the locking mechanism or for lifting the pawl from the recess 63.

Figure 8:
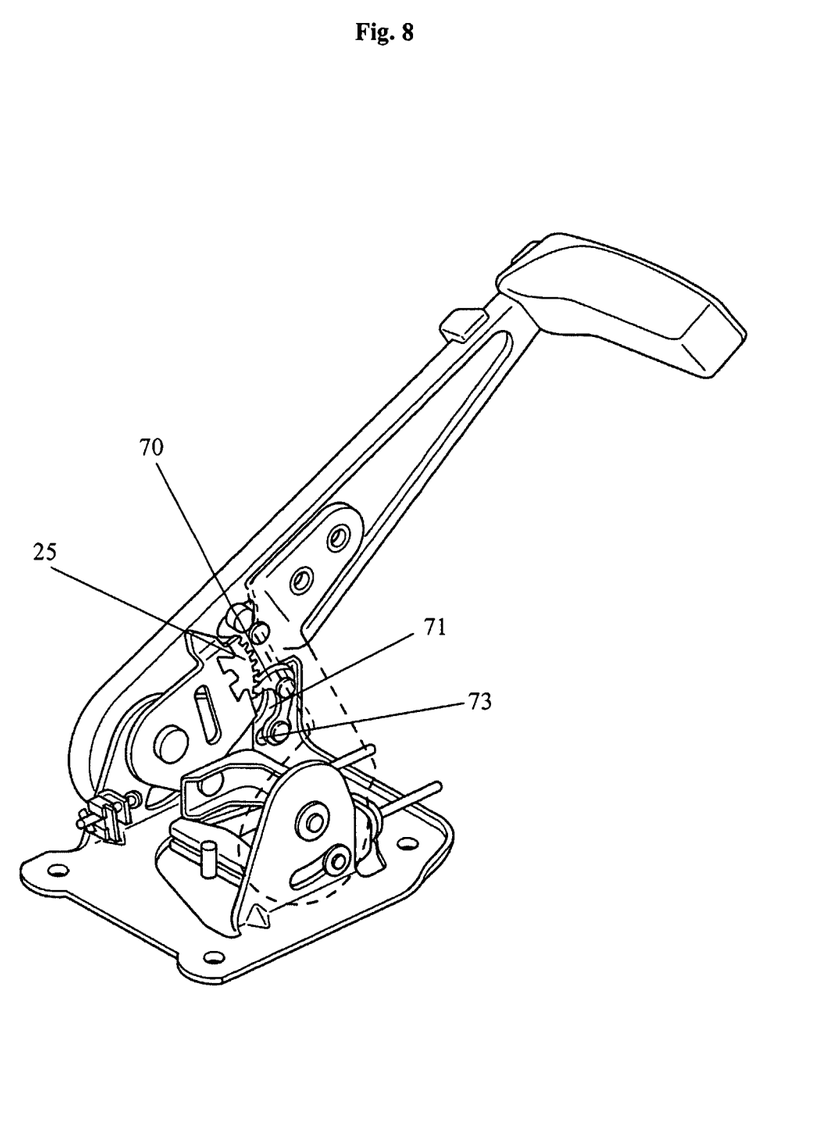
FIG. 8: A view of a further embodiment comprising a ratchet for the locking mechanism.
Figure 9:
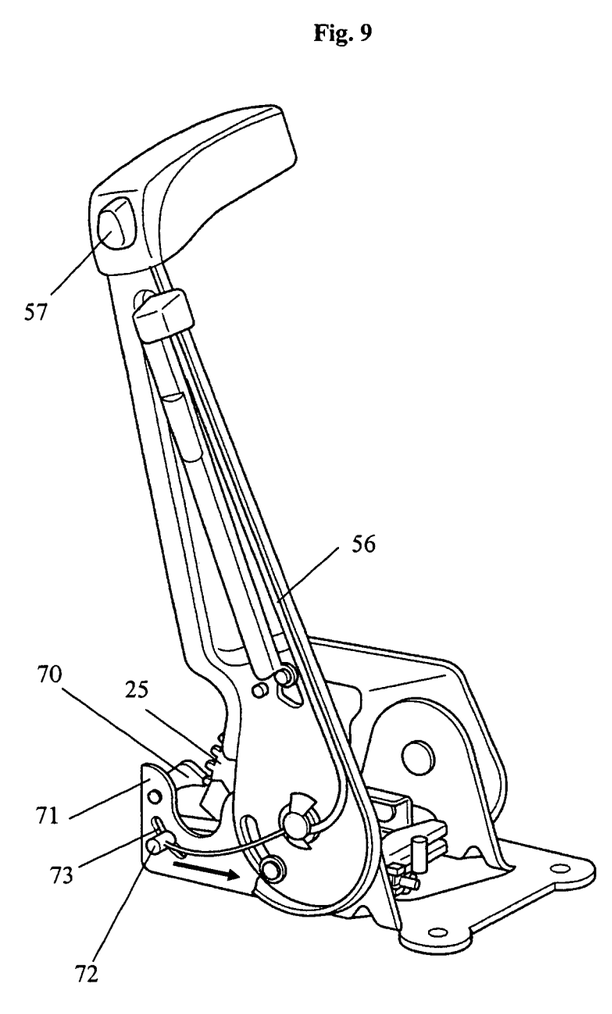
FIG. 9: A lateral view of the embodiment of FIG. 8.

FIGS. 8 and 9 illustrate a further modification. In this embodiment the locking mechanism is realized by a ratchet 70 engaging directly the toothed section 25 of the pulling lever 20 and thereby avoiding that the brake disengages on its own. The ratchet 70 is rotatably arranged on a further mounting projection 71 of the mounting plate 1 and comprises a projection 72 which extends through a longitudinal hole 73 in the mounting projection (cf. FIG. 9). The inner end of a Bowden cable 56 is directly attached to the projection 72 and on its other end connected to the operating knob 57. Also here a linkage may alternatively be used.

If the operating knob 57 is pressed, the projection 72 in the elongated hole 73 is slightly pulled to the rear (cf. arrow in FIG. 9), which lifts the ratchet 70 out of the toothed section 25 of the pulling lever 20. As explained with respect to the preceding embodiment, the brake is thereby disengaged.

The explained lever system is preferably made from plastic materials which combine a high stability with a low weight, for example a suitable polyamide. Components which are subjected to high mechanical loads as the above discussed toothed section 25 or the various projections for entraining the pulling lever 20 and the mounting frame 30 may also be produced from suitable metallic materials.

A unique advantage of the described design is that also the brake lever 10 can be made from plastic materials, since the brake lever 10 is only briefly under mechanical load, when the brake is being applied. After this operation, it is only the pulling lever 20 and the locking mechanism, which has to withstand the forces to keep the brake in the applied position. Since plastic materials can be easily formed into any arbitrary shape, for example by injection molding, the brake lever 10 can be easily adapted to the aesthetic requirements of the interior of the passenger compartment.

The invention claimed is:

1. Operating system for a parking brake of a motor vehicle with a rotatable brake lever which can be manually brought from a release position to a braking position for operating the parking brake and which can without disengaging the parking brake be removed from the braking position, comprising:
   a. a pulling lever which is separatably connected to the same axle around which the brake lever is rotated, such that the pulling lever follows the movement of the brake lever while the brake lever is brought from said release position to said braking position, the pulling lever being further connected to at least one brake cable, such that rotation of the pulling lever operates the brake;
   b. a releasable locking mechanism with a locking element which locks the pulling lever in the brake position, said releasable locking mechanism being controlled by a first operating knob; and
   c. a pawl which allows to separate the connection between the brake lever and the pulling lever independently from the releasable locking mechanism, said pawl being controlled by a second operating knob, wherein
   d. the first and second operating knobs are both arranged at a front end of the brake lever, such that the actuation of both operating knobs can be performed with a single hand; and wherein
   e. the pawl is rotatably arranged at the brake lever and generally directly engages a corresponding recess of the pulling lever.

2. Operating system according to claim 1, further comprising a mounting plate with a rotatable bearing for the brake lever and the pulling lever.

3. Operating system according to claim 2, further comprising a support element which is permanently connected to the brake lever, wherein the brake lever is arranged at a first bearing of the mounting plate and wherein the supporting element is arranged at a second bearing of the mounting plate.

4. Operating system according to claim 3, wherein the pulling lever is connected to a mounting frame, wherein the at least one brake cable is attached to the mounting frame.

5. Operating system according to claim 4, wherein the mounting frame is arranged between the brake lever and the support element.

6. Operating system according to claim 5, wherein the mounting frame comprises at least one guiding rod sliding in a guiding element of the mounting plate.

7. Operating system according to claim 6, wherein the at least one brake cable comprises two brake cables being connected to the mounting frame via an equalizer.

8. Operating system according to claim 1, wherein the locking mechanism comprises a clutch spring allowing in a closed state a rotation of a pinion only in a first direction.

9. Operating system according to claim 8, wherein the pinion cooperates with a toothed section of the pulling lever.

10. Operating system according to claim 9, wherein the clutch spring comprises a free end which can be deflected for a release of the clutch spring.

11. Operating system according to claim 10, wherein the free end of the clutch spring is deflected by a Bowden cable and/or a linkage.

12. Operating system according to claim 1, wherein the locking mechanism comprises a ratchet which cooperates with a toothed section of the pulling lever.

13. Operating system according to claim 12, wherein the ratchet can be separated by a Bowden cable and/or a linkage from the toothed section of the pulling lever to release the pulling lever.

14. Operating system according to claim 1, wherein the pawl can be lifted out of the recess by means of a Bowden cable and/or a linkage.

* * * * *

UNITED STATES PATENT AND TRADEMARK OFFICE
CERTIFICATE OF CORRECTION

PATENT NO.        : 8,469,158 B2
APPLICATION NO.   : 11/570670
DATED             : June 25, 2013
INVENTOR(S)       : Prat Terradas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1521 days.

Signed and Sealed this
Eighth Day of September, 2015

Michelle K. Lee
*Director of the United States Patent and Trademark Office*